United States Patent [19]
Holmberg et al.

[11] 3,734,150
[45] May 22, 1973

[54] SIGNAL CONTROLLED TRIMMING DEVICE

[76] Inventors: Bo F. Holmberg, Box 20, Hammar; Nils Erik Hellström, Strandvagen 21, both of Nyland, Sweden

[22] Filed: Sept. 1, 1971

[21] Appl. No.: 177,015

[52] U.S. Cl. .............................................. 83/474
[51] Int. Cl. ............................................... B27b 5/06
[58] Field of Search ................ 143/41 A, 41 R, 46 R

[56] References Cited

UNITED STATES PATENTS

| | | | |
|---|---|---|---|
| 2,332,654 | 10/1943 | Mead et al. | 143/41 A |
| 328,486 | 10/1885 | Hayes | 143/41 A |

Primary Examiner—Donald R. Schran
Attorney—J. C. Holman et al.

[57] ABSTRACT

Lumber cutting device having plurality of selectively operable saw units each including an arm carrying the saw at one end and being swingable about a shaft at its other end. The shaft is motor-driven and a transmission is provided between the saw and the shaft. The saw units are located beneath a conveyor for the lumber and means are provided for selectively raising a desired saw unit into cutting relationship. Each saw unit has a signal operable latch means cooperating with lifting means designed to raise a given saw unit only when its latch means is set in an active, fixed state.

1 Claim, 4 Drawing Figures

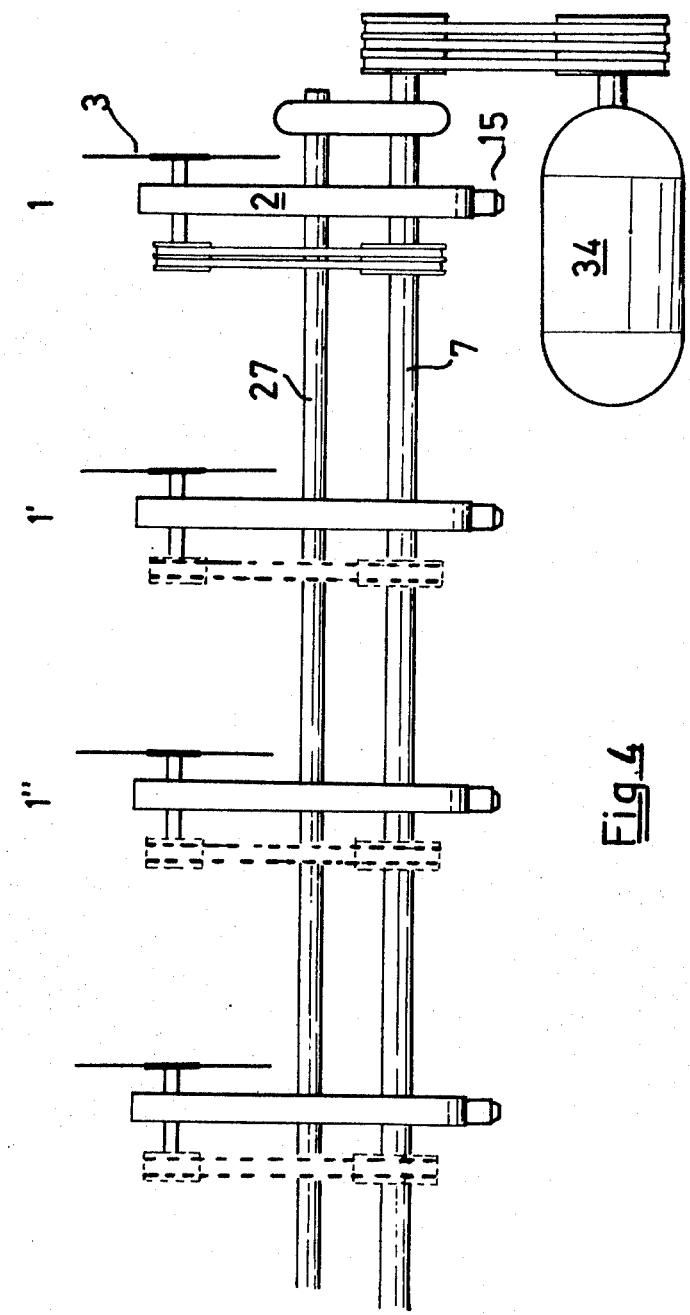

SIGNAL CONTROLLED TRIMMING DEVICE

The present invention relates to a high speed transverse cutting device for lumber adapted to co-operate with a high speed transverse conveyor.

It is the usual practice, when cutting lumber in a modern lumber handling plant, to have saw-blades located transverse to the transport direction, and at a distance from each other of 1 foot, for cutting the lumber to standard lengths. Such saw arrangements are known as "trimmers."

Various designs have been proposed for activating selectively the different cutting units in a trimmer. Most of these have, however, been either far too complicated or sensitive to be able to withstand the large loads imposed on them in a modern, high speed lumber handling equipment, or they have had too slow a response to the activating signals, i.e. they have not been able to be activated and de-activated fast enough, compared with the working rate of the rest of the equipment.

According to the present invention these prior drawbacks are overcome in a trimmer design, comprising a plurality of selectively operable saw units, each of which comprising an arm having a rotating saw at one of its ends, and being swingable about an axis at its other end, said axis being co-axial with a motordriven shaft, and in which each of said saw units further comprise a transmission between said shaft and said rotable saw blade, the saw units being located below the plane of a transverse conveyor and adapted to be selectively swung up in the path of lumber pieces being transported on said conveyor. Such a design is known per se from e.g. the U. S. Pat. No. 2,332,654 to Elmer C. Mead et al.

According to the invention, however, each of said saw units is provided with signal operable control means, being adapted to be set in either of two states, one of said states being an activated fixed state, and the other being a passive yielding state, and that a common member is arranged to act on each one of said control means in synchronization with the boards of lumber arriving on the conveyor in such a manner, that the respective saw unit is lifted if the control member is in its activated, fixed state in order to bring the saw up in the path of the lumber piece.

In this manner it is possible to operate the trimmer at a very high speed, mainly because the rotating saw does not have to travel farther than a distance corresponding to the thickness of the board.

These and further characteristics of the present invention will become more apparent upon reference to the following specification and the appended drawings.

DESCRIPTION OF THE DRAWING FIGURES

FIG. 4 shows part of a complete trimmer arrangement viewed from above.

DESCRIPTION OF A PREFERRED EMBODIMENT

Figure 1:
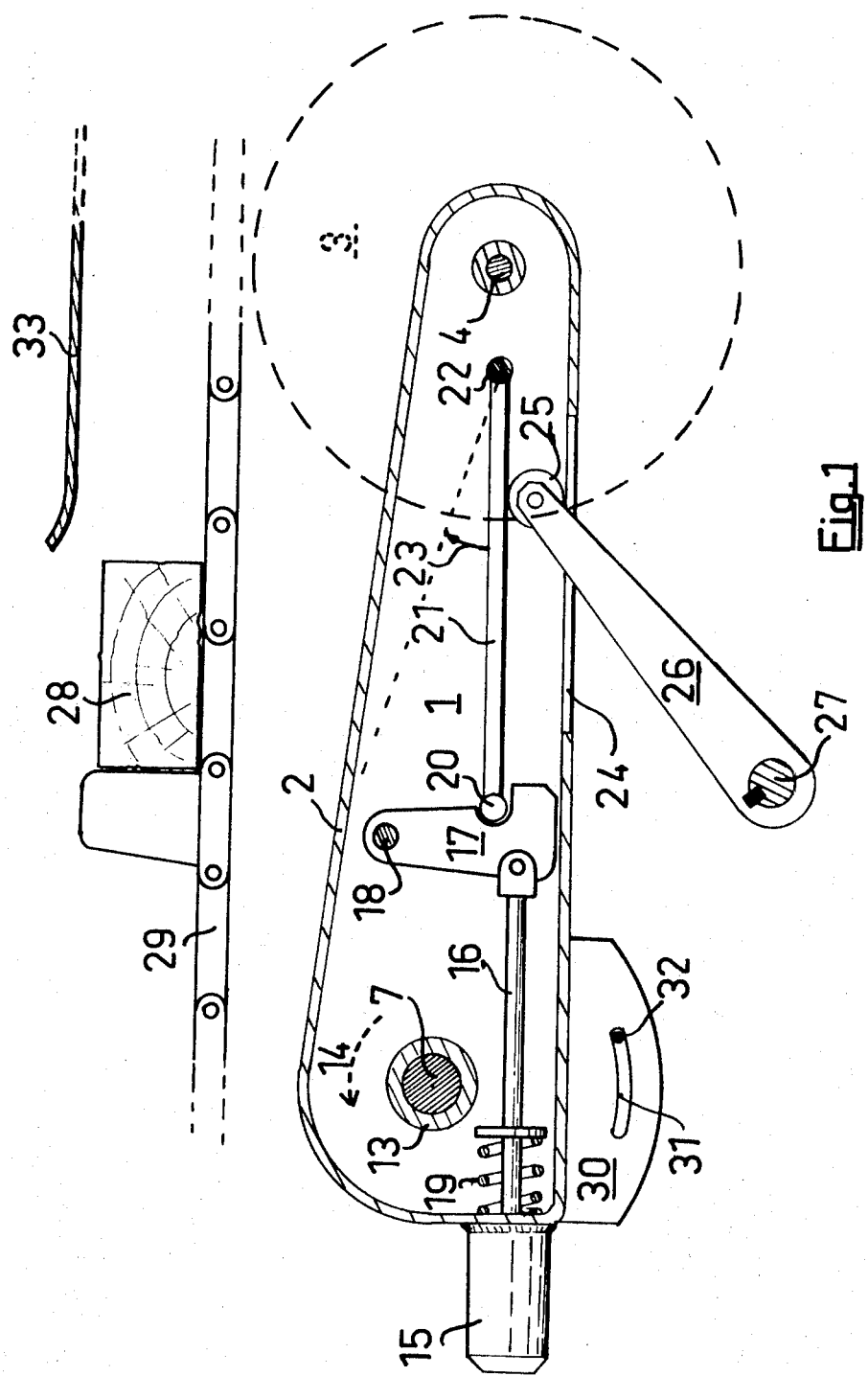
FIG. 1 is a side view of a trimmer according to the invention.
Figure 2:
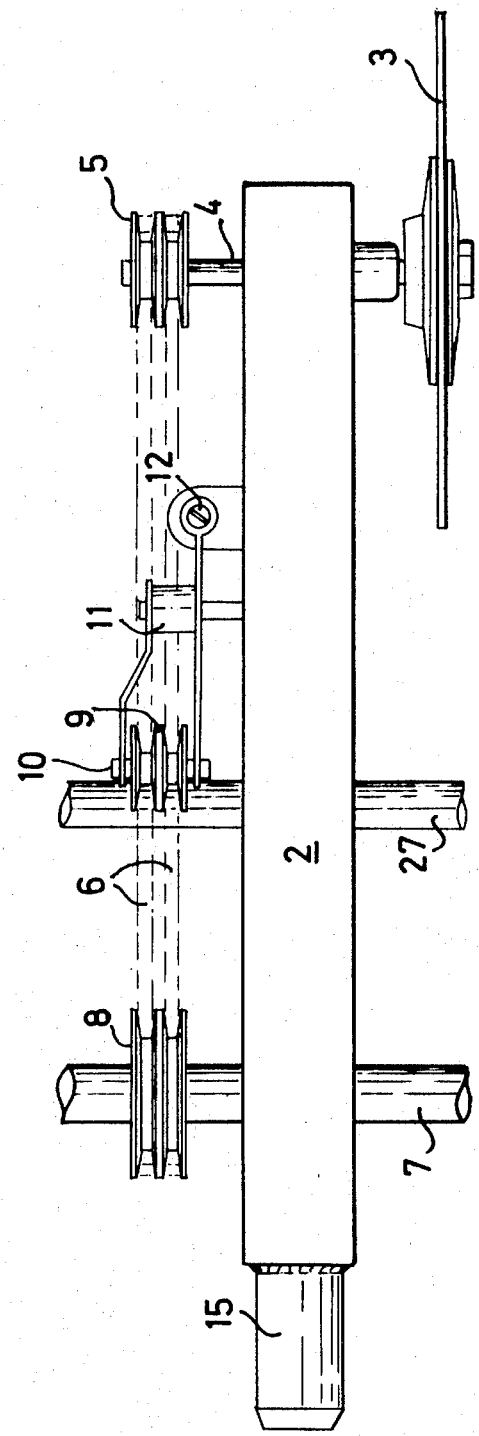
FIG. 2 shows the trimmer viewed from above.

Referring to FIGS. 1 and 2 there is shown one trimmer unit 1 according to the invention, comprising a hollow, elongated arm 2, which may be cast from light metal or made from sheet metal. At one end of the arm 2 a rotable saw-blade 3 is journalled in a bearing 4. The saw-blade 3 is essentially parallel to the arm and located on one side thereof.

On the opposite side of the shaft 4 there is a V-belt pully 5 by means of which the saw-blade 3 is driven from the common shaft 7 via a second V-belt pully 8 and two or more V-belts 6. On the arm 2, between the pullies 5 and 8 there is an idler pully 9 journalled on a shaft 10, secured between the shanks of a fork-like member 11. The member 11 is adjustable in order to enable the V-belts to be tensioned properly. This is effected by means of the adjustment screw 12.

The arm 2 opposite the rotating saw is swingably mounted about the shaft 7 by means of a bearing 13. It should be understood, that the shaft 7 rotates freely in the bearing 13 in the direction indicated by the arrow 14, and that thus the shaft 7 is intended to drive the rotating saw, but not to impart to the arm 2 any turning movement.

At the free end of the arm 2, opposite to the rotating saw there is a suitable motor 15 adapted to impart a reciprocating movement to the arm 16. The motor 15 may be an electromagnet, the armature of which is connected to the arm 16, but it may alternatively also be a pneumatic or hydraulic motor.

The opposite end of the arm 16 is connected to a locking latch hook 17 which may turn about an axis 18. A spring 19 normally urges the arm 16 to the right in the figure, and the latch 17 towards its locking position. When the motor 15 is activated, the latch 17 is pulled to the left, against the force of the spring 19.

The latch 17 co-operates with a roller 20 at one end of a second arm 21, and the roller may be kept in engagement with a recess in the latch. The opposite end of the second arm 21 is swingably journalled about an axis 22 in the hollow arm 2 in such a way, that when the roller 20 of the arm 21 is not in egagement with the recess of the latch 17, it may turn freely upwards inside the hollow arm 2 about the angle 23. In the lower portion of the hollow arm 2, underneath the arm 21, there is provided an elongated opening 24 through which the arm 21 may be acted upon by a roller 25 journalled at one end of a rocker arm 26. The rocker arm 26 extends radially from and is secured to a shaft 27 which in the same manner as the shaft 7 is common to all the saw units in the trimmer and which is parallel to the shaft 7. The rocker arm 26 moves upwards in the counterclockwise direction synchronous with the arrival of lumber pieces 28 to be trimmed.

Figure 3:
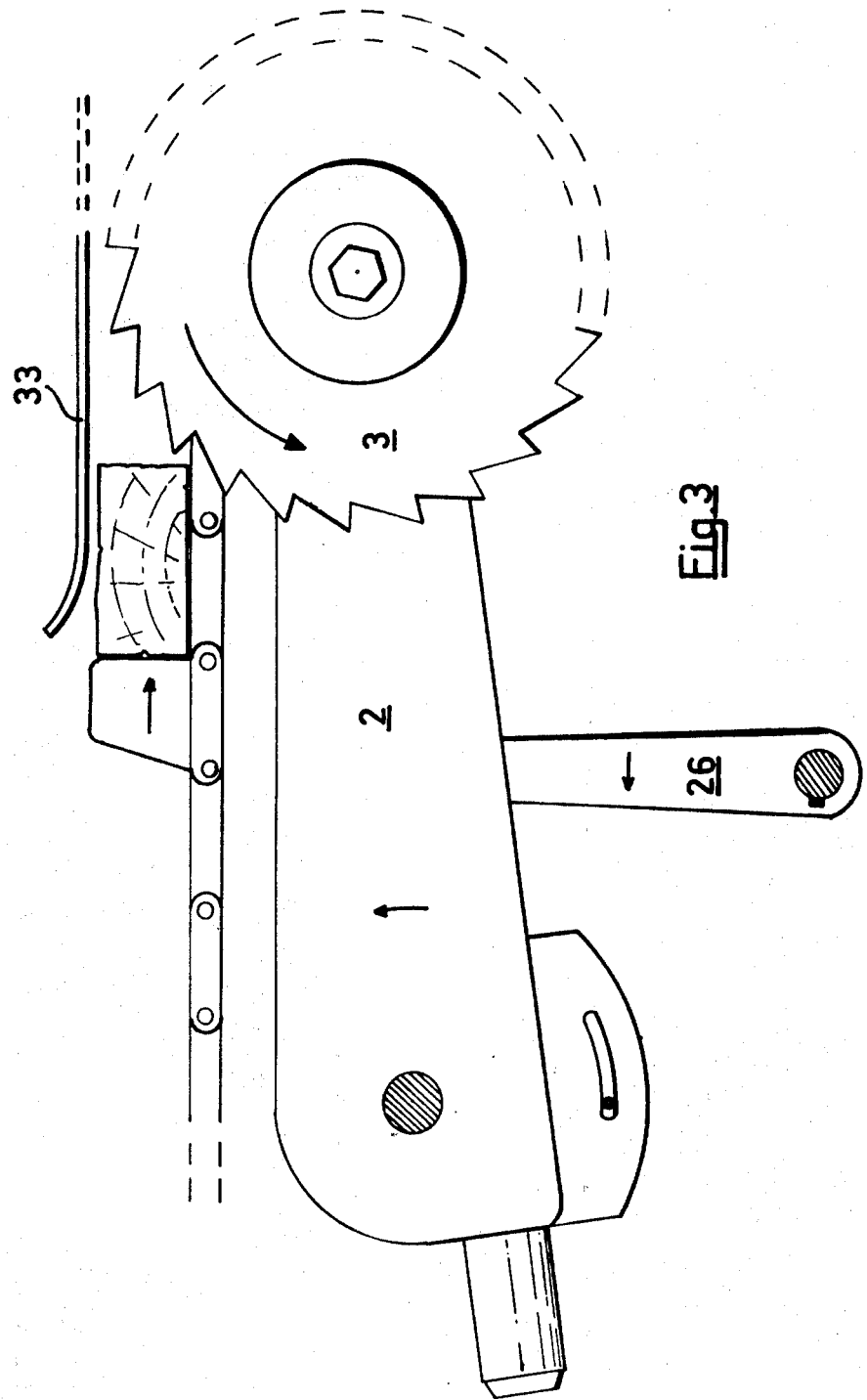
FIG. 3 shows, in a simplified manner, the relation between the various parts of the trimmer, the piece of lumber, and the conveyor, prior to the trimming.

As mentioned before, and is best illustrated in FIGS. 1 and 3, the saw units are located directly below the plane of the transport chains 29 for the pieces of lumber. By the co-operation between the rocker arm 26 and the arm 21 the saw unit may be lifted when desired, and the saw-blade 3 be brought up before the lumber piece 28.

As long as the motor 15 pulls back the latch 17 no such lifting will take place, and the saw unit remains in the lower, non-activated position, shown in FIG. 1. When the motor 15 is de-energized, however, it will be appreciated that the rocking movement of the arm 26 will be able to lift the saw unit up to the active position shown in FIG. 3.

A collar 30 on the arm 2 may be provided with an arcuate recess 31 concentric with the shaft 7, and cooperationg with a fixed pin 32 serving as safety and limiting device.

A trimmer according to the invention comprises, as is best illustrated in FIG. 4, a plurality of saw units 1, 1', 1", . . . . , parallel to each other and arranged on a common shaft 7, and controlled by a common rocker shaft 27.

It should be evident to anyone skilled in the art, that of course the saw units should be located between the chains 29 of the conveyor, and that a plurality of hold-down fingers 33 may be located over the conveyor in order to hold the piece of lumber which is being sawn down. The motors 15 of the saw units are preferably operated from a control device.

The common shaft 7 may preferably be driven by an electromotor 34 via a suitable transmission.

If long pieces of lumber are to be handled, there may be provided two saw units, one for the right-hand and one for the left-hand side of the conveyor. The units may be similar or mirror images of each other, and the reason for deviding the trimmer into two units is, that this reduces the torsional strains in the shafts 7 and 27.

There is the possibility of moving the pieces of lumber in the transverse direction prior to trimming, so that the root end cut will always be aligned with the fixed saw. Thus one of the saw units in an arrangement shown in FIG. 4 may always be kept in the upper position, similar to the one shown in FIG. 3, and be used for the root end cut. It is obvious that in this case some parts of the control mechanism may be left out, and the arm simply be held fixed in the upper, active position.

Such modifications are, however, merely matters of choice, and should be obvious to any person skilled in the art.

What we claim is:

1. In a cutting apparatus for lumber, comprising a plurality of parallel and selectively operable saw units, in which each saw unit comprises an arm having a rotable saw blade at one end thereof, and having its opposite end swingably journalled about a shaft in a vertical plane, said shaft being driven by a motor, and each saw unit having a transmission between said shaft and said saw blade, said saw units being located under the plane of a transverse conveyor for lumber, said apparatus comprising selectively operable means for rising a desired saw arm and blade to an active position for cutting an arriving piece of lumber, characterized in that each of said saw units are provided with signal operable latch means adapted to be set in either of two states, one of said states being an active fixed state, and the other being a passive, free state, and that further for each of said units there is provided lifting means on a common shaft, said lifting means co-operating with each of said latch means to rise said saw unit to an operable position only if said latch means are set in said active, fixed state.

* * * * *